United States Patent [19]
Brown

[11] Patent Number: 4,493,968
[45] Date of Patent: Jan. 15, 1985

[54] ADAPTIVE WELDER WITH LASER TV-SCANNER

[75] Inventor: Ronald D. Brown, Mapleton, Ill.

[73] Assignee: Caterpillar Tractor Co., Peoria, Ill.

[21] Appl. No.: 513,533

[22] Filed: Jul. 13, 1983

[51] Int. Cl.³ .............................................. B23K 9/12
[52] U.S. Cl. ................................ 219/124.34; 318/577; 356/376; 358/107; 901/9; 901/42; 901/47
[58] Field of Search ...................... 219/124.34, 124.22; 318/577; 356/376, 387; 358/107; 250/202; 901/9, 42, 47

[56] References Cited

U.S. PATENT DOCUMENTS

| | | | |
|---|---|---|---|
| 3,135,857 | 6/1964 | Von Voros | 219/125 |
| 3,511,965 | 5/1970 | Johnson | 219/125 |
| 3,532,807 | 6/1970 | Webb | 178/6 |
| 3,609,288 | 9/1971 | Sciaky | 219/121 |
| 3,757,125 | 9/1973 | Okada et al. | 250/202 |
| 3,766,355 | 10/1973 | Kottkamp | 219/121 |
| 3,775,581 | 11/1973 | Sciaky | 219/121 |
| 3,855,446 | 12/1974 | Kotova et al. | 219/125 |
| 3,895,870 | 7/1975 | Cullen et al. | 358/107 |
| 3,976,382 | 8/1976 | Westby | 356/120 |
| 4,021,840 | 5/1977 | Ellsworth et al. | 358/101 |
| 4,146,926 | 3/1979 | Clerget et al. | 356/376 |
| 4,192,986 | 3/1980 | Udagawa et al. | 219/124.34 |
| 4,306,144 | 12/1981 | Masaki | 250/202 |
| 4,328,416 | 5/1982 | Dudley et al. | 250/202 |
| 4,412,121 | 10/1983 | Kremers et al. | 219/124.34 |
| 4,417,127 | 11/1983 | Nachey et al. | 318/577 |

FOREIGN PATENT DOCUMENTS

| | | |
|---|---|---|
| 18781 | 11/1980 | European Pat. Off. . |
| 77140 | 4/1983 | European Pat. Off. . |
| 2500182 | 7/1976 | Fed. Rep. of Germany . |
| 2737055 | 3/1978 | Fed. Rep. of Germany . |
| 2711660 | 9/1978 | Fed. Rep. of Germany . |
| 3228994 | 3/1983 | Fed. Rep. of Germany . |
| 56-26676 | 3/1981 | Japan ............................ 219/124.34 |
| 495172 | 7/1976 | U.S.S.R. . |

OTHER PUBLICATIONS

Kawahara et al., "Tracking Control for Guiding Electrodes Along Joints by Pattern Detection of Welding Groove", V. 15, No. 4, 1979, pp. 78-83, *Society of Instruments and Control Engineers Transactions*.

R. W. Richardson, "Seam Tracking Sensors–Improving all the Time", 9/1981, pp. 77-82, *Welding Design and Fabrication*.

*Primary Examiner*—Clifford C. Shaw
*Attorney, Agent, or Firm*—Krass, Young & Schivley

[57] ABSTRACT

The invention pertains to a welding system having automatic groove tracking and adaptive groove filling capabilities. Data produced by a coordinated laser spot projector (10) and TV-scanner (12) combination is determined to an Intel 8085 computer (28) to provide a substantially continuous analysis of groove locations in a three-axis coordinate system as well as groove depth and area. Location information is fed to an LSI-11 computer (38) to control the tracking function through coordinate axis servo-type drives (46) and to control a fourth-axis or "swing" function which provides freedom between the welding torch (14) and the optical system (10, 12) which leads the torch by several inches. The groove depth and area information is also fed to the LSI-11 to control the welding parameters, i.e.; deposition rate and voltage and produce the desired weld along the groove.

12 Claims, 8 Drawing Figures

ADAPTIVE WELDER WITH LASER TV-SCANNER

DESCRIPTION

1. Technical Field

This invention relates to apparatus for optically scanning a weld groove to provide data which is used to adaptively control a groove filling operation through control of certain welding variables, and to provide a weld groove tracking function.

2. Background Art

Fabrication of various products involves the production of large and complex weldments. Examples are housings for heavy machinery and frame elements for earth-moving equipment. Such fabrication involves jigging the pieces of the weldment in the desired abutment, alignment or match to define a weld seam or groove, and filling the weld seam or groove with weld material.

Although spot welds are commonly carried out by automated equipment, it is more common for long groove-filling operations to be carried out by hand; i.e., a human operator guides the welding torch along the groove or seam and manually controls such parameters as voltage, torch speed and weld material (typically wire) flow rate.

The prior art shows effort to automate complex welding operations by groove or seam tracking accompanied by optical analysis of the location to be filled.

Westby, U.S. Pat. No. 3,976,382, "Procedure and Apparatus for Determining The Geometrical Shape of a Surface", issued Aug. 24, 1976, discloses an optical system for casting a shadow across a weld groove which can be viewed by a TV camera to provide profile data usable for controlling weld fill operations.

Ellsworth et al, U.S. Pat. No. 4,021,840, "Seam Tracking Welding System", issued May 3, 1977, discloses a raster scan TV system which scans across a weld seam or groove to produce voltage pulses indicating the point of interception with the seam or groove. These pulses may be used to control a tracking function via servo drive devices.

Webb, U.S. Pat. No. 3,532,807, "Automatic Closed Circuit Television ARC Guidance Control", issued Oct. 6, 1970, is a further disclosure of a welding system using a TV monitor and a guidance or tracking system.

None of the prior art systems satisfactorily addresses the problem of generating complete and accurate data representing the physical parameters of the weld area so that control of a welding torch is readily accomplished. The present invention addresses and solves this problem.

The present invention is directed to overcoming one or more of the problems, as set forth above.

DISCLOSURE OF INVENTION

According to a first aspect of the invention, improved optical apparatus is provided for scanning a weld track and providing data representing the location and geometry of the weld area so as to permit adaptive control of the weld process. This is accomplished by providing a monochromatic light spot which is projected onto the work and caused to scan laterally across the weld track, and a scan system which repetitively scans across the spot path and generates a digital data profile of the weld area.

BEST MODE FOR CARRYING OUT THE INVENTION

DETAILED DESCRIPTION

Figure 1:
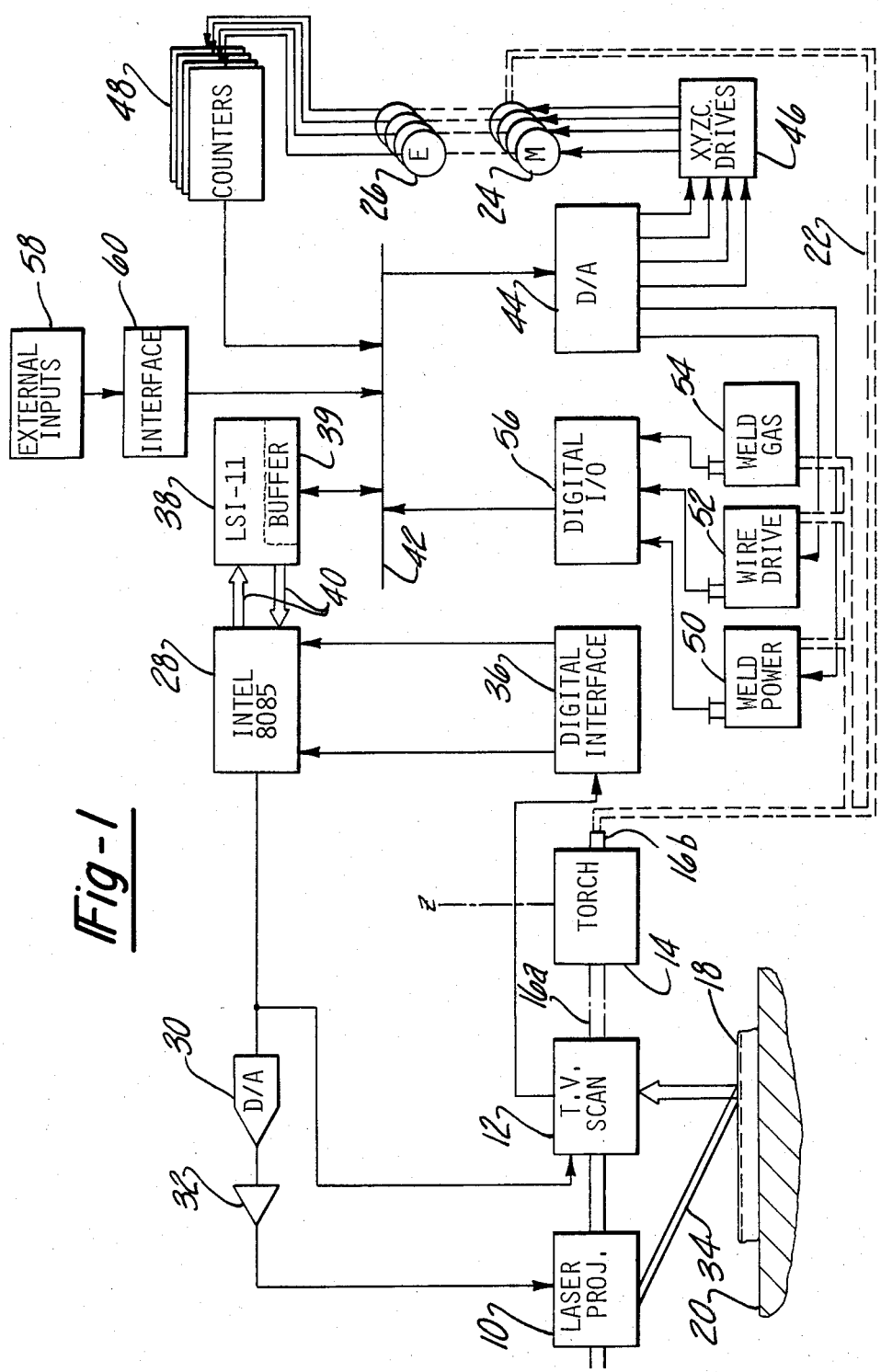
FIG. 1 is a block diagram of an adaptive welding system embodying the invention.

A three-axis system for adaptive, automated welding is shown in FIG. 1. A laser-projector 10 and a raster-scanning type TV camera 12 such as General Electric TN 2500 make up the basic optical system and are mounted along with a MIG-type wire welding torch 14 on a movable platform 16a, 16b for controlled motion relative to a workpiece 18 which lies on a fixed support 20. The support 20 lies within a three-axis (Cartesian) coordinate system of which the Z or vertical axis extends along the centerline of the torch 14. The break between platform portions 16a and 16b indicates a fourth degree of freedom which allows projector 10 and scanner 12 to rotate or "swing" about the Z-axis so that the optical system, which leads the torch 14 by about 4 inches, can follow a weld groove without disturbing the X, Y coordinates of the torch.

The platform 16 is mechanically connected, as represented at 22, to axis drive motors 24 which cause the platform 16 to move in the desired direction, to the desired degree and at the desired rate to follow a weld groove in the workpiece 18. Encoders 26 monitor the extent and direction of rotation of the motors 24 in the conventional servo-positioning fashion to keep track of the relation between commanded positions and actual positions of the platform 16 along the X, Y, Z axes and about the Z axis.

An Intel 8085 digital computer 28 is connected through a digital-to-analog converter 30 and amplifier 32 to a galvanometer-type mirror drive in the projector 10 to cause a beam 34 of monochromtic light to be projected at an angle onto the workpiece 18 and to move linearly across the weld groove at a controlled rate, as hereinafter described in more detail with reference to FIGS. 2 and 3. The reflection of the beam 34 from the surface of the workpiece 18 is received by the TV-camera scanner 12, also described in more detail with reference to FIGS. 2 and 3, to produce a digital data stream which is operated on by the interface 36 to provide data to the Intel 8085 computer 28 representing the peak intensity locations of the laser beam reflection at controlled time intervals.

From this data, the Intel computer 28 generates a set of ten signals and provides these signals to an LSI-11 computer 38 via an RS-232C data link 40. The ten signals are:

(1) X, Y coordinates of center of groove area along the laser scan;
(2) X, Y coordinates of left edge of groove;
(3) X, Y coordinates of right edge of groove;
(4) Z coordinate of left edge;
(5) Z coordinate of right edge;
(6) depth of groove;
(7) area of groove;
(8) check sum;
(9) end of message; and
(10) sync signal.

From these data, the LSI-11 computer 38 generates the necessary outputs to the axis servos 46 for tracking purposes and to the welding system 50, 52, 54 for control of the filling parameters. Specifically; the computer 38 is connected via a bus 42 to the D/A converter 44 to provide rate signals to the X, Y, and Z and C (Swing) axis drives 46 to operate the motors 24 in such fashion as to guide the torch 14 along the weld groove as it is viewed by the scanner 12. Since the scanner 12 looks ahead of the torch 14 by about four inches, a store of about 20 position commands is placed in a ring-buffer 39 in the computer 38 and output to the axis drives 46 on a FIFO basis as needed to move the platform 16 at the desired rate. Counters 48 maintain a current count of position-increment pulses from the encoders 26 representing the current position of the torch 14 and platform 16 within the coordinate system. This data is fed back to the computer 38 via the bus 42 for comparison to position commands and for generation of error signals in conventional servo fashion.

The computer 38 also provides weld-fill control signals via a converter 44 to a weld power controller 50 and a wire drive unit 52 to vary the welding parameters according to a desired end result, e.g., to achieve a certain pre-established fill percentage. The controller 50, unit 52 and a welding gas control solenoid 54 all have on-off controls such as pushbuttons which are connected via an I/O unit 56 to the bus 42 to advise the computer 38 that these units are or are not in condition for control by the computer 38. Although shown in the drawing as being on the units themselves, the on-off pushbuttons are usually mounted on a remote control panel in actual practice.

Conventional external inputs such as jog, tape drive and keyboard inputs may be entered via a unit 58 and an interface 60 associated therewith.

The simultaneous, coordinated control of the tracking and weld-fill functions is an important feature of the system as it provides not only variability in the selection of weld characteristics but also allows the system to compensate for relatively wide variations in the groove itself. For example, it is common to manually provide a number of tack welds along the groove to hold parts together prior to final welding and the present system senses the material build-up of these tack welds as variations in weld area and varies the deposition rate in the area of each tack to prevent overfilling.

Figure 2:
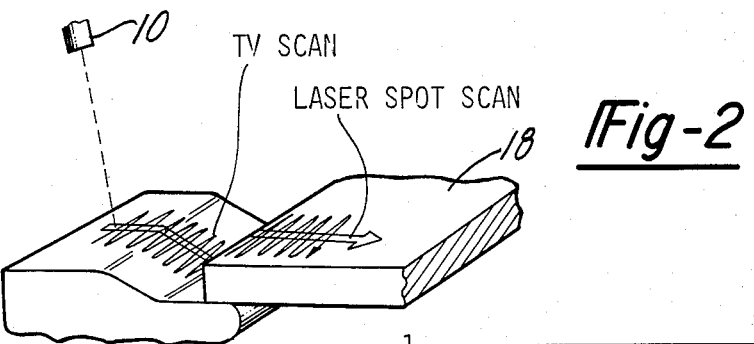
FIG. 2 is a detailed drawing representing the light spot and TV scanning functions of the optical apparatus in the system of FIG. 1.
Figure 2A:
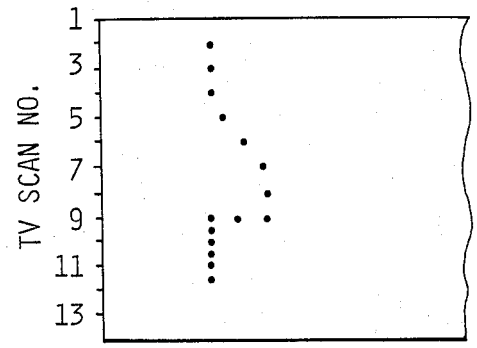
FIG. 2a is a representation of a digital weld groove scan using the apparatus of FIG. 1 in the scanning mode suggested by FIG. 2.

Referring now to FIGS. 2, and 2A, the spatial and timing characteristics of the projection and scanning operations provided by the units 10 and 12 are explained. The laser beam is projected onto the workpiece 18 at an angle of about 25-30 degrees from vertical measured in a plane parallel to the groove. The spot is caused to travel a path across the groove, i.e., the beam sweeps through a second plane which intersects the weld groove. Through the aforementioned galvanometric mirror drive, the spot is then returned to the beginning position at a rapid rate and caused to scan or travel back across the groove again and again. Since the platform 16 is typically moving along the groove, the resulting pattern is a series of parallel stripes across the groove, spaced apart in the direction of platform travel.

The TV-scanner camera 12, on the other hand, has a viewing axis which is essentially vertical and a raster scan sensor-strobe function which cuts across the laser spot scan at right angles. Because of the 25 degree difference between the projection angle and the viewing angle, the point along any given raster scan at which the TV camera scanner intercepts the laser spot is related to the length of the optical path from the projector 10 to the reflection surface and, hence, to the depth of the groove. This point of interception is determined on the basis of reflected light intensity; i.e., intensity is greatest at the intercept point. The result is a series of digital signals which, taken in their entirety, represent the groove profile over a given laser scan or, if desired, over a series of such scans.

It will, of course, be noted that the scan rate of the TV camera 12 is much larger than that of the projector 10; i.e., the camera scan path cuts across the laser spot path many times during each increment of laser spot path movement. In an actual embodiment, the camera 12 exhibits a 248×244 pixel array and three complete scans of the array (each scan being hereinafter termed a "frame") occur for each sweep of the laser spot. However, this ratio of frames per spot sweep may be varied from 1:1 to 4:1 or more to vary the signal-to-noise ratio of the input signal to the camera 12. The variation is readily achieved via the programming of the Intel computer 28.

Figure 3:
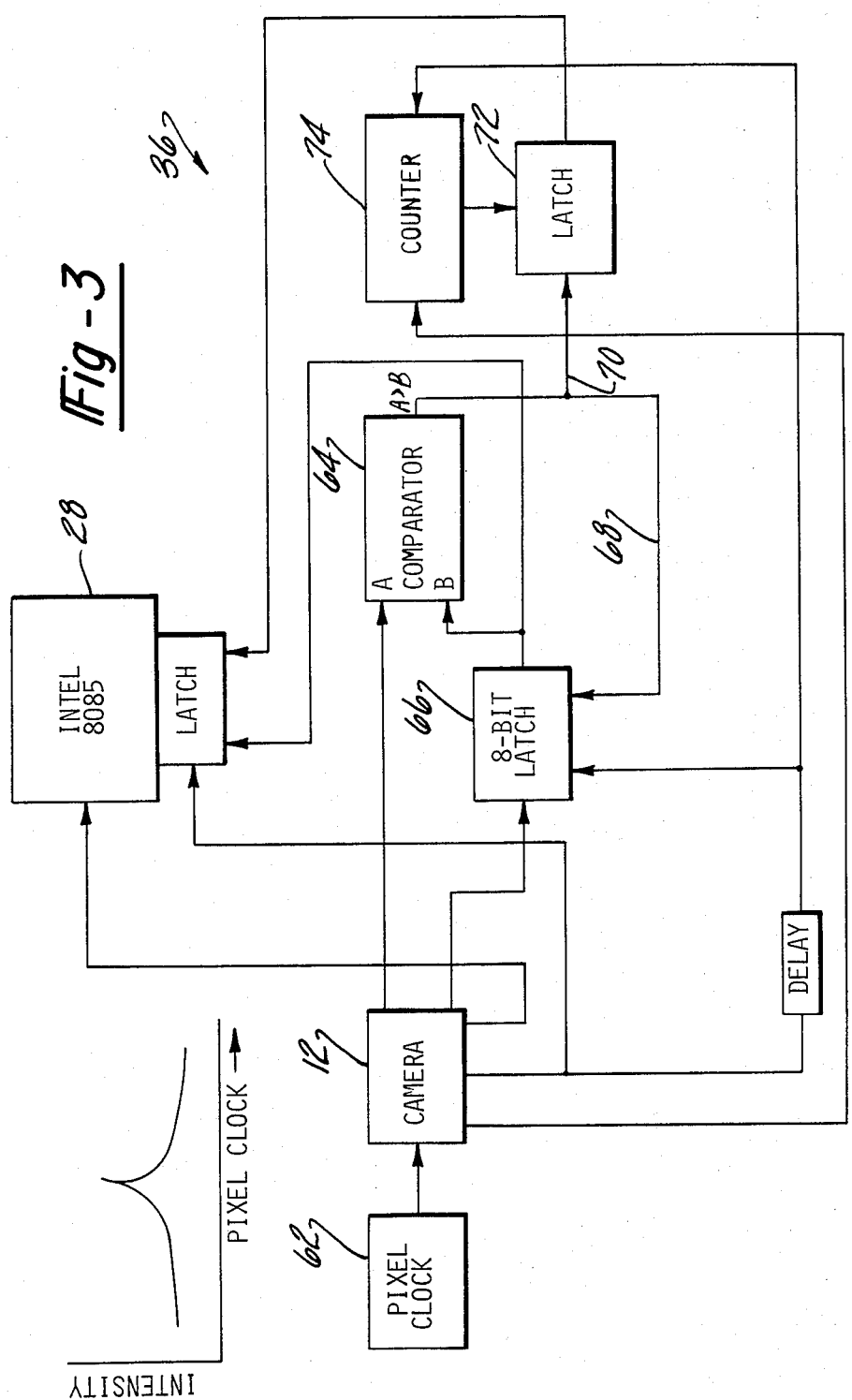
FIG. 3 is a detailed block diagram of an interface between the optical system and a data processor embodiment of FIG. 1.

FIG. 3 illustrates the digital interface 36 in greater detail. The overall purpose of this unit is to present to the Intel computer 28 a series of signals from which the coordinates of the workpiece surface can be derived at spaced points along the laser spot scan path. From this information, the computer 28 determines the value of the first seven of the output quantities listed on page 2 above by straightforward mathematical calculation.

More specifically, the interface unit 36 provides a digital number (8-bits) representing the pixel clock count at which the camera raster scan intercepts the laser spot during each of the passes of the scan path represented in FIG. 2. By eliminating all pixel counts except the count which represents an interception and, therefore, an actual groove depth, the interface reduces the data processing function of the computer 28 to a significant degree.

The pixel clock 62 effectively strobes the pixels of the sensor array in the camera 12 to scan across the laser path. Each pixel output is effectively a measure of the intensity of reflected laser light received by that pixel and is applied to one input of a comparator 64 and to an 8-bit latch 66. As long as each new pixel intensity signal (A) is greater than the previous intensity signal (B) the output on line 68 enables the latch 66 to receive and store a new signal for reference on the next count and also advances, via line 70, the count stored in the latch 72 from the counter 74. Recognizing that the laser spot reflection spreads appreciably, the pixel outputs will continue to increase in intensity as long as the camera scan is approaching the center of the reflection. After the center is passed, the intensity signals begin to fall off and the condition A>B needed to advance the count in latch 72 is no longer satisfied. The stored count remains, therefore, at a number representing the Z coordinate of the work surface at which the intercept occured. At the end of each camera scan line, an "EOL" signal strobes the count from the latch 72 into the computer 28 as a peak position count and, after a short delay, resets the counter 74 and clears the latch 66. An end-of-frame (EOF) signal from the camera 12 is input to the computer 28 to establish the portion of the laser spot patch which has been examined and digitized (in the preferred embodiment, one-third).

A peak intensity signal is also strobed into the computer 28 for verification purposes, i.e., failure to produce a peak which falls between pre-established limits is used to rule data invalid or to shut down the welder.

It is to be noted that although a scanning-type TV camera 12 is used, no actual image suitable for human viewing is produced, i.e., the purpose of the camera is to provide a digital signal set representing the groove profile several inches ahead of the welding area and to provide enough data to enable the tracking and welding parameter adjustment functions to occur. A TV monitor can be connected into the system on a temporary basis to verify the fact that the scanner digitizer functions are working, but the image is merely a broken-line trace of the groove profile.

Software involves two major divisions; VIZ, the camera data analysis routine carried out by the Intel 8085, and the track and fill control function carried out by the LSI-11. In addition, the software-controlled functions of the LSI-11 are subdivided into several subroutines, the most important of which are TRACK, SWING, and FILCTL (fill control).

Figure 4:
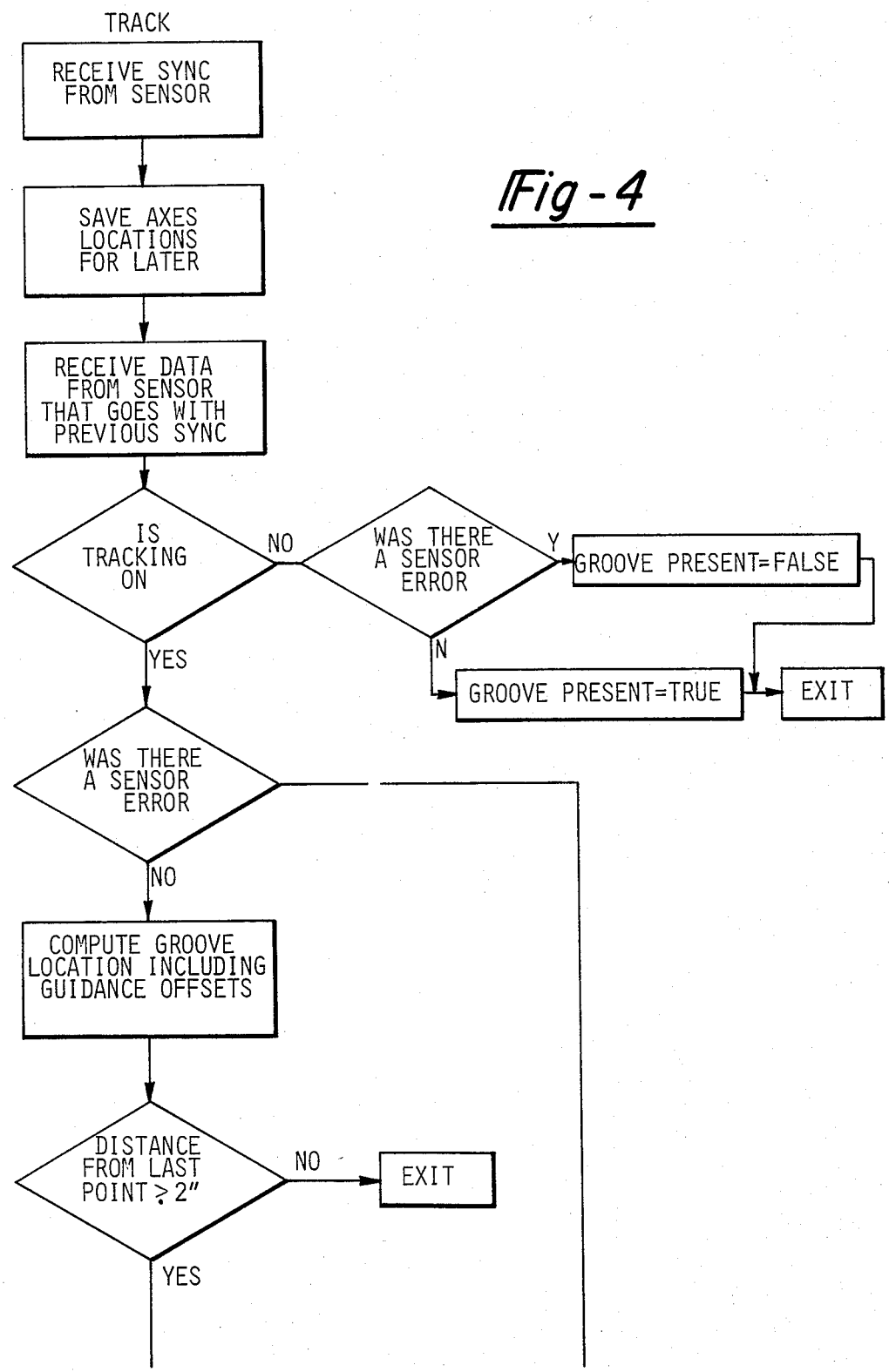
FIG. 4 is a flow chart of part of the software used in the preferred implementation of the invention.
Figure 4A:
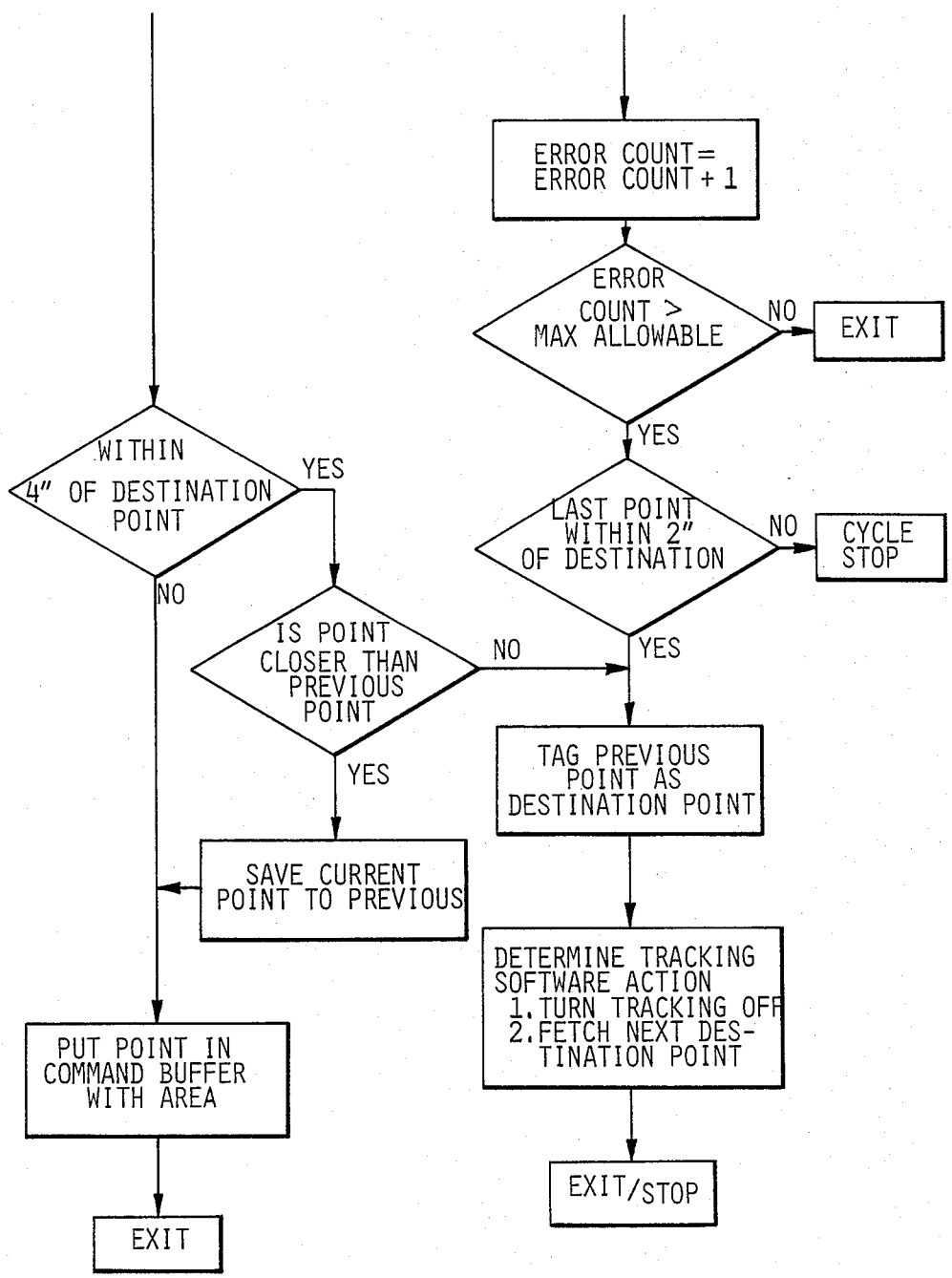

The camera micro computer 28 is essentially free running. Once it has finished analyzing an image and transmitted the resulting data to the control computer 38 it takes another image and begins the whole process anew. A carriage return character is sent to the control computer 38 to notify it that a new image is being taken. The character catching routine in the control computer 38 recognizes the carriage return as a sync character and saves the current location of all the axis for later use. Once all of the data from the current image has been received by the character catching routine, it activates the routine "TRACK", a representative embodiment of which is shown in flow chart form in FIG. 4.

If tracking is not enabled then TRACK simply sets a software flag true if a groove is in the field of view of the camera and false if not. If tracking is enabled, then the sensor data and the axis locations saved when the image was taken are used to determine the location of the weld groove. First the vertical position of the groove is calculated using an average of the right and left edge vertical camera data. This position is then converted from camera units to engineering units. Then the distance from the torch to the laser beam is adjusted based upon the height and the known angle of the laser beam. A combination of the center of area of the groove and the location of the left edge, or right edge, or the center of area and a guidance bias is used to calculate the coordinates of the groove. Standard textbook trig functions are used.

At this time the distance from this point to the previously used point is checked and if that distance is less than some arbitrary minimum, the current point is discarded and the track routine suspended. If the distance is sufficient, a test is made to determine if the previously used point is the closest possible point to the current program point. If so then that point is tagged as being the program point and the interpreter for the sensor is called. At this point the steps taken are totally determined by the program being interpreted. For the typical case, the next instruction would be to interpret the weld stop program. The first instruction in that program is currently the "tracking off" instruction which causes the whole tracking process to cease.

If, however, the previous point was not the closest to the program point then the current point is placed in the first in, first out buffer (FIFO). The area of the groove at this point is also placed in the FIFO for use by the fill control routine when the weld torch nears the associated X, Y, Z point.

Also at this time the "SWING" routine is called to maintain the sensor centered over the groove ahead of the torch. The swing routine uses some of the most recent points placed into the FIFO to compute the equation of a line which approximates the path of the upcoming groove. Then the intersections of a circle whose radius is the distance between the torch and the point where the laser beam strikes the workpiece are calculated. The center of circle is placed at the point to which the torch is currently traveling. The proper intersection is chosen and the correct sensor head angle is calculated to place the sensor over that intersection. This angle is made part of the current servo command so that when the torch reaches the current command point, the sensor will also reach the desired angle.

The above processes continue until they are stopped by either a "tracking off" instruction in the program, or the stop button, or a predetermined number of continuous sensor errors.

The points are removed from the FIFO as needed and used to command the computer servo software where to move the machine axis. If the system is welding and the fill control is on, the area is also removed from the FIFO and used by the subroutine called "FILCTL". FILCTL uses the groove area to predetermine the described weld metal deposition rate in pounds per hour. The larger the groove area, the greater the deposition rate, within limits. From the deposition rate and the known physical data of the wire, the desired wire-feed speed is calculated. Once the wire feed is determined, the travel speed is calculated to achieve the desired groove fill percentage. Given the calculated travel speed and wire-feed speed, the arc voltage is calculated and adjusted via the controller 50.

Industrial Applicability

Figure 5:
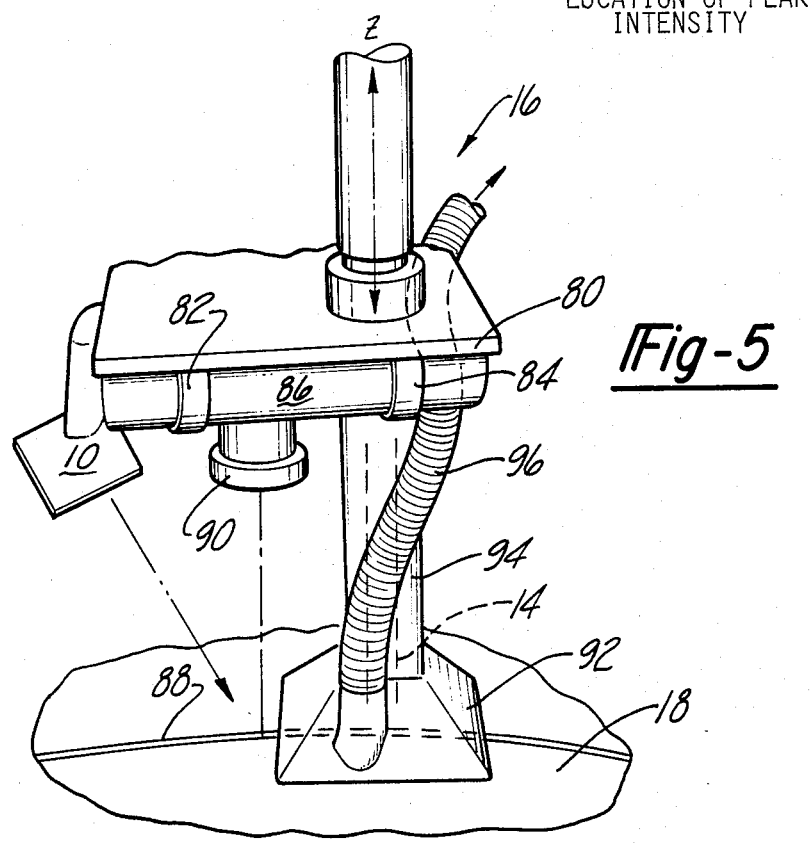
FIG. 5 is a side view of a carriage apparatus for certain optical and mechanical components of the FIG. 1 embodiment.

FIG. 5 is a view of an actual embodiment of the system of FIGS. 1 and 3 as embodied in a single torch M/G welder. The platform 16 comprises a servo-positionable structure depending from a cross beam and movable vertically relative to the workpiece 18 along the Z-axis. A plate 80 having depending arms 82 and 84 carries a conventional low-power helium-neon laser 86 which projects its output beam laterally via mirrors to the scan-projector 10 containing the galvo-driven mirror which aims the beam downwardly toward the groove 88 in the workpiece 18.

A camera lens 90 of the camera 12 is stationed about 10 inches above the work 18 and focuses on a spot about four inches ahead of the torch 14. A filter 90 mounted on the lens end of the camera 12 is selected to pass light only at 632.8 nanometers; i.e., the wavelength of the laser output, to filter out glare from the welding torch 15 which leaks out from under a shield 92 carried at the bottom of the plate 94. A vacuum system comprising one or more hoses 96 may be used to remove smoke from the weld area.

Swing motion about the Z-axis is produced by a motor 110. Since the Z-axis runs through the center of the torch, swing movements do not affect the X, Y, Z coordinates of the torch itself. Such movements do, however, affect the X, Y coordinates of the scan area and thereby permit the optical system 10, 12 to follow curves in the groove 88 ahead of the weld coordinates. Guidance programs, previously described, are provided for this function.

Figure 6:
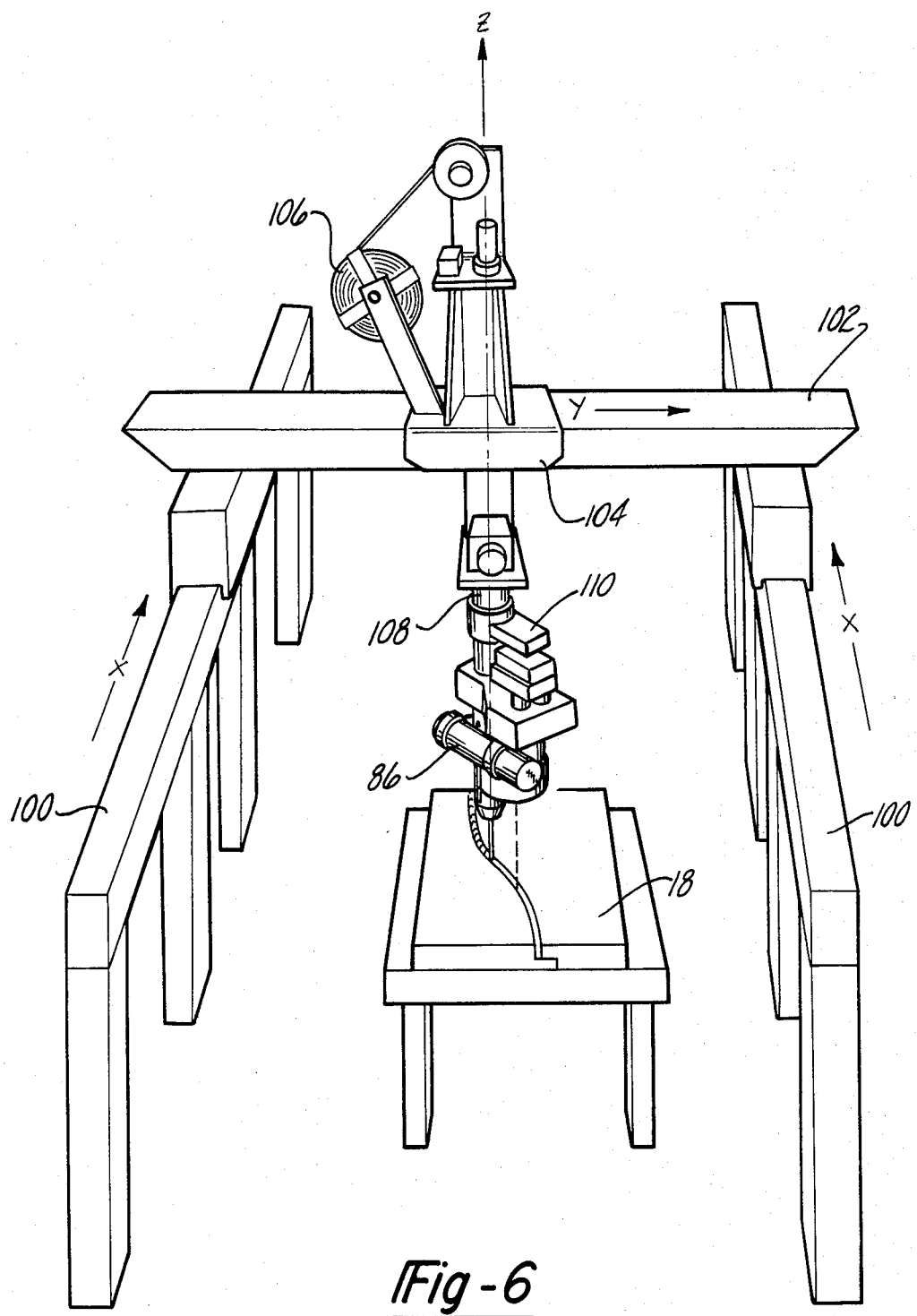
FIG. 6 is a perspective drawing of a three-axis welding apparatus embodying the system of FIGS. 1-4.

FIG. 6 shows essentially the physical arrangement of the four-axis guidance system. X-axis displacement is provided by spaced parallel rails 100 raised above the floor and open-ended to provide entry and exit for the work. A Y-axis support 102 spans the two rails 100 and is mounted thereon by way of wheels to allow displacement. A linear gear-tooth track runs along one of the rails and is engaged by a pinion gear driven by a belt-connected motor and gear-box combination. An encoder above the motor generates pulses representing displacement. The Y-axis carriage 104 is similarly mounted on support 102 and carries the wire reel 106 and wire feed motor. A X-axis drive 108 raises and lowers the platform 16 relative to support 102 and carriage 104 for height control. The swing axis system is described previously.

Other aspects, objects, advantages and uses of this invention can be obtained from a study of the drawings, the disclosure and the appended claims.

I claim:

1. In an adaptive welding apparatus:
   means (10) for projecting a spot of monochromatic light onto a work surface defining a weld groove at an angle of incidence less than 90° and causing said spot to move repetitively along a spot scan path extending laterally across the weld groove and at a first repetition rate;
   means (12) for repetitively scanning the spot scan path at a second repetition rate higher than the first rate to detect variations in reflected intensity of the spot along said scan path;
   means (36) for producing a series of digital output signals in response to locations of peak intensity reflections in a three-axis position coordinate reference; and
   processor means (28) for producing signals representing the weld groove profile along the spot scan path in response to receiving the digital output signals.

2. Apparatus, as defined in claim 1, wherein the scanning means (12) includes a raster-scan type TV camera.

3. Apparatus as defined in claim 2, wherein the apparatus further comprising a filter (90) attached to scanning means (12) for passing only light of the wavelength of the monochromatic light.

4. Apparatus, as defined in claim 1, wherein the moving means (10) projects said spot along a first optical axis (34) and the scanning means (12) views the spot reflection along a second optical axis angularly spaced from the first axis.

5. Apparatus, as defined in claim 1, wherein the moving means (10) includes a laser light source (86).

6. Apparatus, as defined in claim 1, wherein means (36) includes means (64) for identifying the peak intensity of a reflection during a scan, and means (62,72,74) for determining the relative position of the peak intensity reflection.

7. Apparatus, as defined in claim 1, wherein the processor means (28) includes a digital computer programmed to calculate groove area across a scanned section.

8. Apparatus, as defined in claim 1, wherein the processor means (28) is connected to moving means (10) and controls the spot scan rate.

9. Apparatus, as defined in claim 1, including movable platform means (16) for carrying said moving means (10) and said scanning means (12) in respective locations, and a welding torch (14) mounted on said platform means (16) in a position spaced apart from the position of means (12) along a weld track, said torch having a vertical axis (z) which is horizontally spaced from the spot scan path.

10. Apparatus, as defined in claim 9, including means (100, 102, 104, 108) for permitting movement of the platform (16) along X and Y-axes in the plane of the weld track and a Z-axis extending through the welding torch (14).

11. Apparatus, as defined in claim 10, including means (110) for rotating the platform means (16) about the Z-axis.

12. Apparatus, as defined in claim 11, including servo-drive means (46) for controllably positioning the platform means (16) relative to the weld track.

* * * * *